Aug. 14, 1934.  W. E. BERNHARD  1,969,871
POWER SHOVEL
Filed Feb. 10, 1930   5 Sheets-Sheet 1
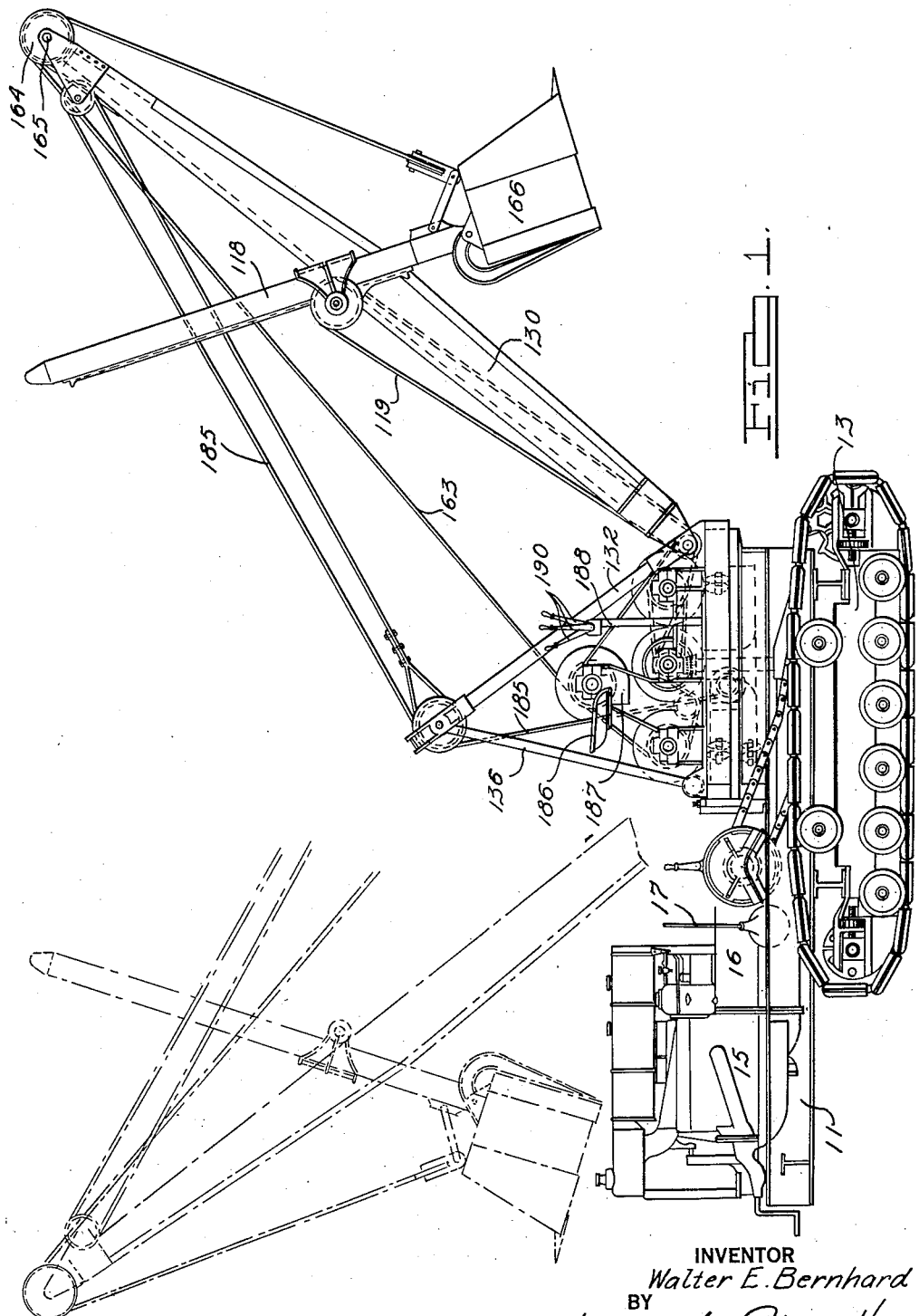
INVENTOR
*Walter E. Bernhard*
BY
*Harness, Dickey, Pierce & Hann*
ATTORNEY

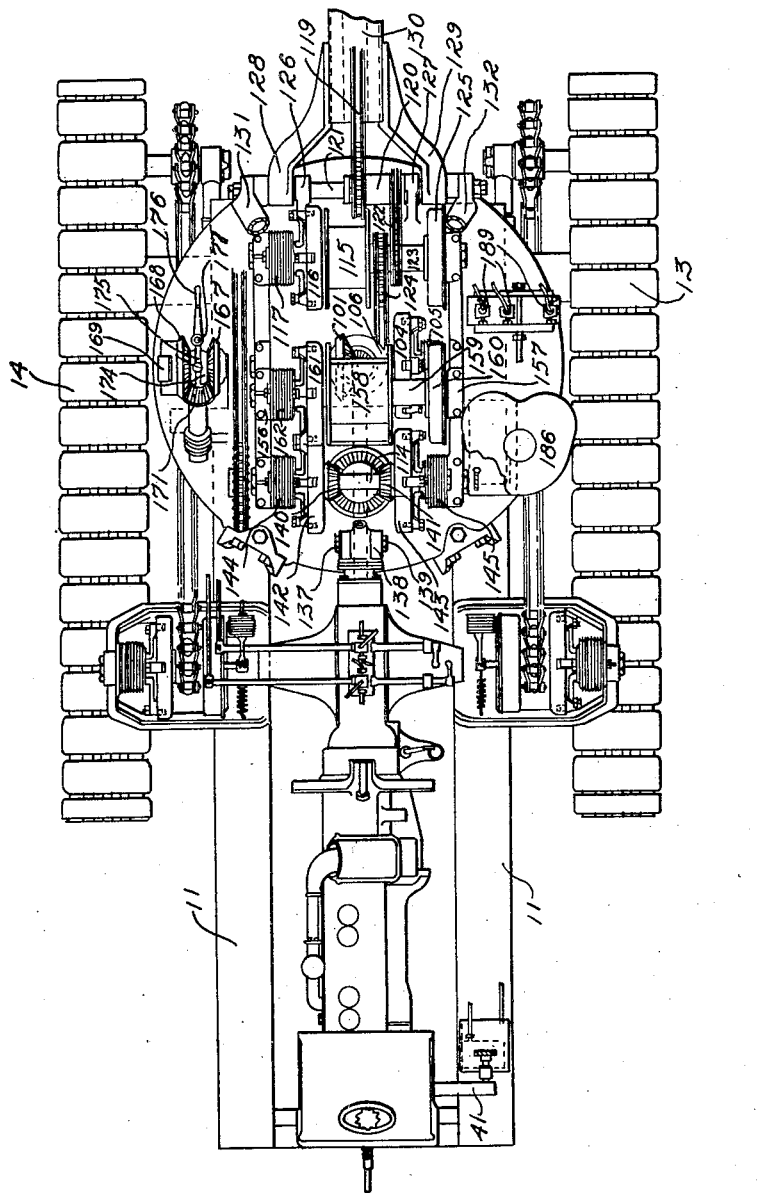

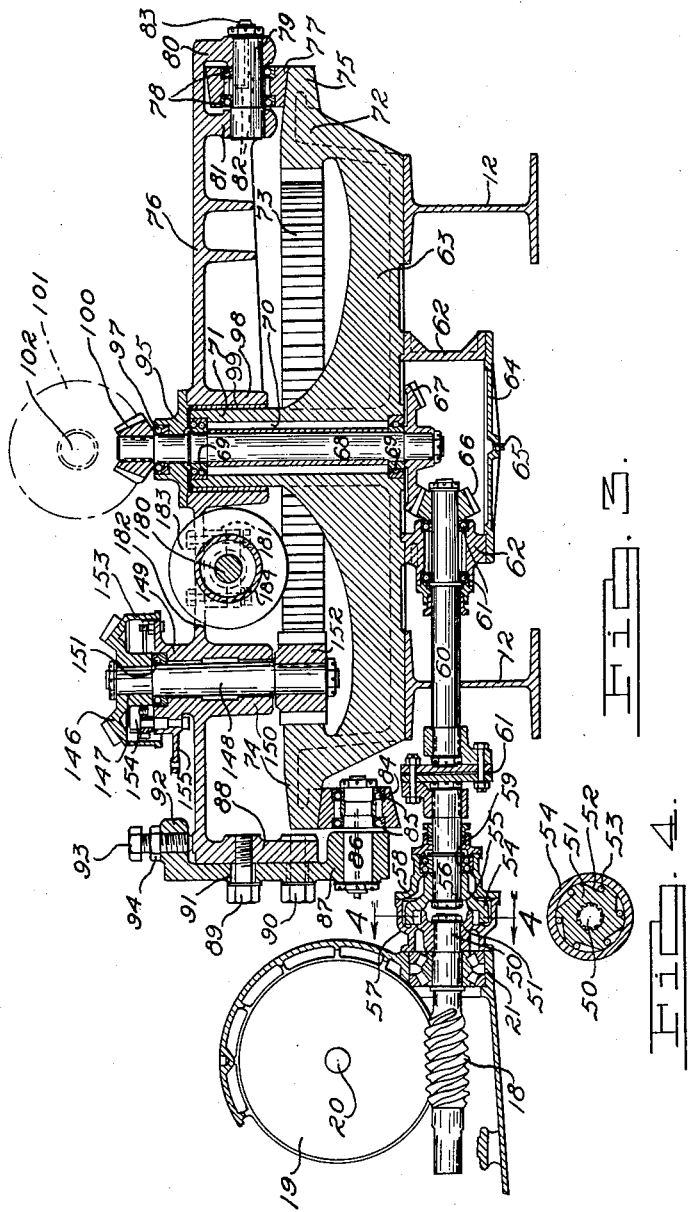

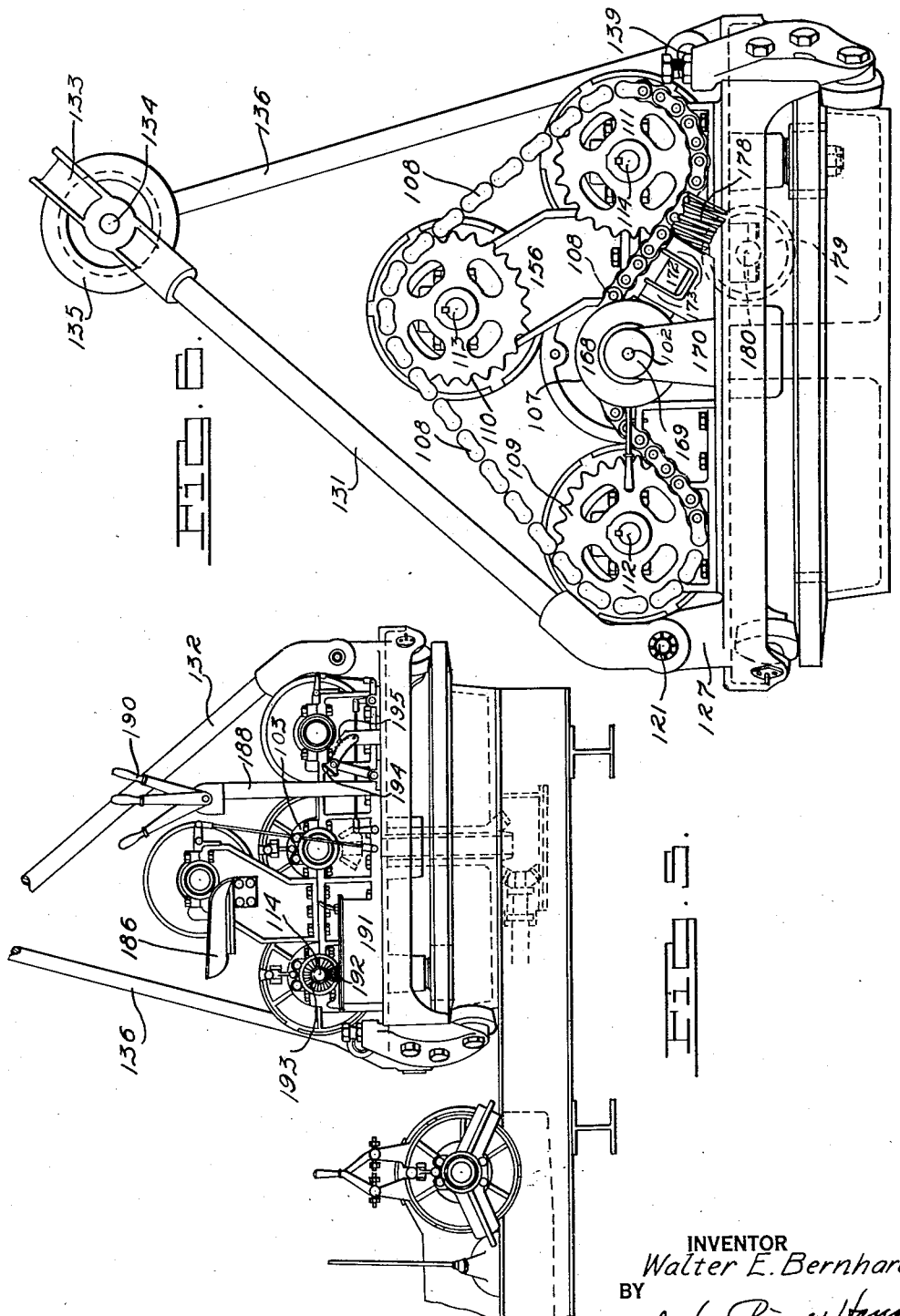

Aug. 14, 1934.   W. E. BERNHARD   1,969,871
POWER SHOVEL
Filed Feb. 10, 1930   5 Sheets-Sheet 5
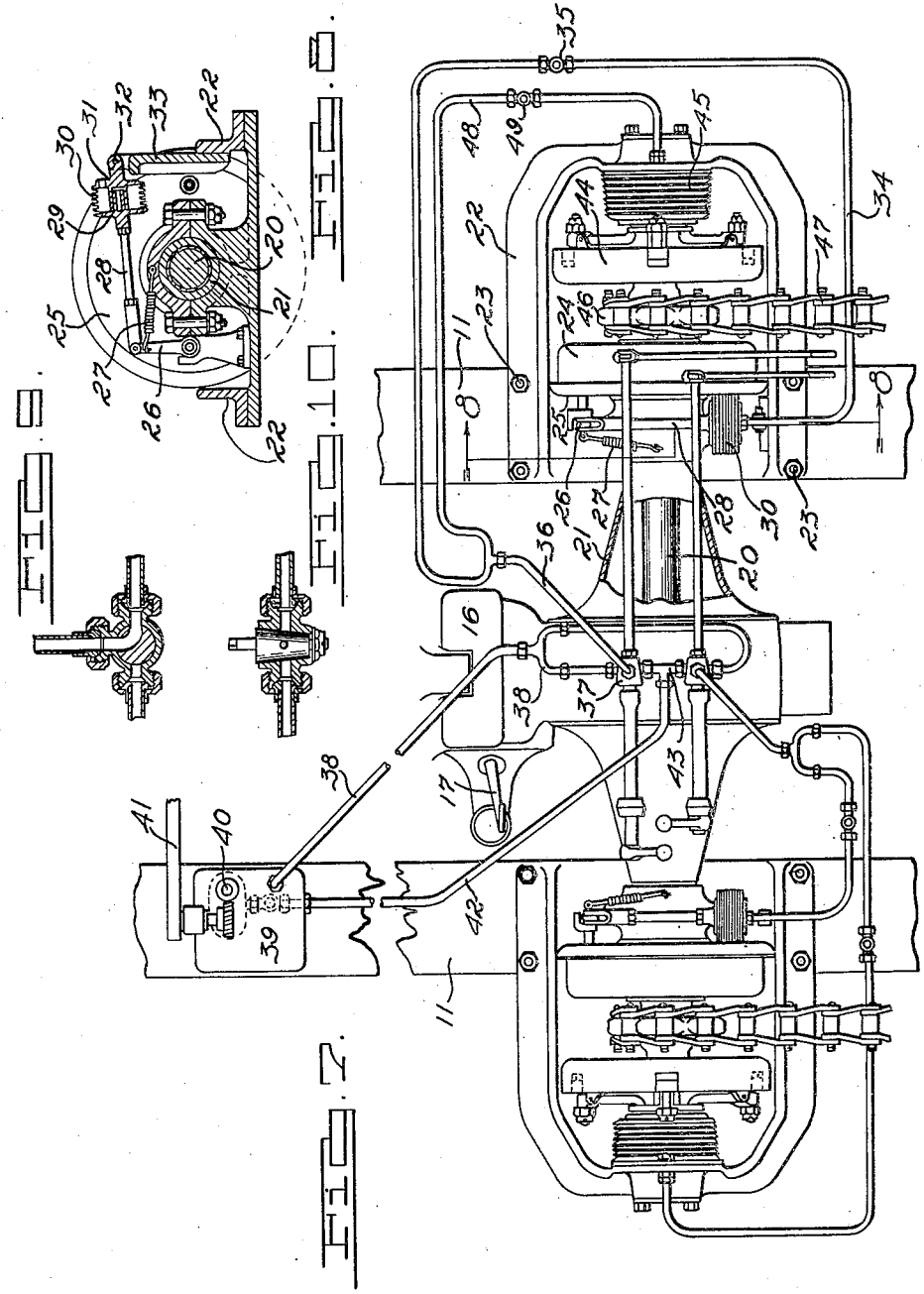
INVENTOR
Walter E. Bernhard
BY
ATTORNEY Patented Aug. 14, 1934

1,969,871

UNITED STATES PATENT OFFICE 1,969,871

POWER SHOVEL

Walter E. Bernhard, Detroit, Mich., assignor to Michigan Power Shovel Company, a corporation of Michigan Application February 10, 1930, Serial No. 427,129

5 Claims. (Cl. 214—135)

This invention relates to improvements in power shovels.

The main objects in this invention are to provide a power shovel for excavating in which the turntable, which carries the boom, is permitted to make a complete rotation; to provide a shovel of this character in which the power is derived from a tractor which is mounted stationarily with respect to the turntable; to provide a tractor driven shovel which may be moved about under its own power with no possibility of accidental operation of the turntable, boom or crowding mechanism; to provide an improved arrangement in which the tractor serves as a counter-balance for the bucket during the digging operations, but without any back brace for the mast being tied to the tractor which would interfere with a full 360 degree swing of the turntable; to provide improved means for mounting the turntable on its platform and to provide improved means for controlling the application of power to the endless treads upon which the excavator is mounted.

An illustrative embodiment of this invention is shown in the accompanying drawings, in which Fig. 1 is a view in side elevation of my improved power shovel and with a fragmentary portion of the boom and shovel shown in dotted outline in a position turned 180 degrees from that shown in the full outline.

Fig. 2 is an enlarged top plan view of the same with part of the mast and boom broken away.

Fig. 3 is an enlarged vertical fragmentary sectional view showing the drive connections from the tractor to the turntable and mechanism carried thereon.

Fig. 4 is a sectional view taken on the line 4—4 of Fig. 3, looking in the direction indicated by the arrows.

Fig. 5 is an enlarged fragmentary view in elevation of one end of the supporting frame with the platform and turntable mounted thereon.

Fig. 6 is a further enlarged view of the same taken from the opposite side of the mechanism as viewed in Fig. 5, and showing the driving connections to the various elements.

Fig. 7 is an enlarged fragmentary top plan view of the fluid operated means for controlling the drive from the tractor to the caterpillar treads.

Fig. 8 is a sectional view taken on line 8—8 in Fig. 7, looking in the direction indicated by the arrows.

Fig. 9 is an enlarged sectional view through one of the control valves.

Fig. 10 is a similar view of the same taken perpendicularly to the plane of the view shown in Fig. 9.

In the construction and operation of power shovels designed for excavating purposes and the like, it is of considerable value to have an arrangement of mechanism whereby the boom which carries the bucket may be turned a full and complete 180 degrees in either direction. This is of particular value where a narrow cut is being made through a hill, inasmuch as the excavator can be moved forward into the cut and as the bucket is filled, the turntable which carries the boom is then turned directly to the rear so that the bucket may discharge its load into a truck which has been backed into the narrow cut directly behind the excavator.

On power shovels or excavators of this type where the mast has a rearwardly extending brace which is fastened to the supporting frame work at the rear of the turntable, such rear brace will prevent the turntable from having a full swing in either direction so that the bucket can discharge directly to the rear, that is, at a point 180 degrees from the point of loading, except where the cut is made sufficiently wide for the excavating machine to be turned at an angle with respect to the direction of the cut which it is making. It is often desirable to make narrow cuts which are no wider than the overall width of the endless tractor treads, and therefore, if the cut has to be additionally widened in order that the machine may be placed at an angle therein, it is readily seen that a large amount of additional earth must be excavated, which materially increases the overall cost of the job.

In my improved power shovel or excavator, a cut may be made which is no wider than the width of the endless treads and furthermore, no time is lost in straightening up the machine, moving it ahead and then turning it at an angle again, as is necessary with the prior art machines. With my improved tractor it may be continuously moved forward into a narrow cut, digging its way as it goes and the boom and turntable rotated 180 degrees in either direction, so that the bucket can discharge into a truck which is backed into the cut immediately behind the excavator.

In the construction shown in the drawings, a generally rectangular shaped, horizontally disposed supporting frame, 11, which is preferably constructed of I-beams, with suitable cross members, 12, is mounted upon a pair of endless tread mechanisms, 13 and 14, which are disposed in spaced parallel relation at opposite sides of the frame 11.

A tractor, 15, preferably of internal combustion motor type, such as a Fordson, is mounted between side frames 11, at one end thereof. The tractor 15 has a selective gear transmission 16, integrally connected thereto, which provides the usual three speeds in a forward direction and one speed in a reverse direction, the gears being controlled by a gear shift lever 17. The driven shaft from the transmission 16 is provided with a worm, 18, which drives the usual ring gear 19. The standard differential mechanism is removed, however, from the tractor axle, and a relatively large continuous shaft 20 is substituted therefor, which extends transversely of the tractor in the same manner as the usual axle shafts and which is driven by the ring gear 19.

The opposite outer ends of shaft 20 are provided with braking and driving mechanism which are of the same construction, so that a detailed description of one will suffice for both. The outer end of the tractor axle shaft housing, 21, is mounted on a U-shaped frame work, 22, which is secured by bolts 23, to the supporting frame 11. A brake drum, 24, is rigidly connected to outer end of sprocket 46 and a supporting plate 25 covers the open face of the drum 24, and carries suitable expanding brake shoes which engage the inner side of the drum 24 and which are operated through suitable lever connections 26. A helical tension spring 27 is connected to the lever arms 26 so as to normally maintain the brake shoes in expanded condition against the brake drum so that the brake is normally applied at all times.

Means are provided for releasing the brakes and comprise a link 28, having one end connected to the brake lever 26 and the other end joined to the movable end 29, of an expansible bellows 30. The opposite end of the bellows 30 is pivotally connected at 32 to an upstanding bracket 33, which is rigidly secured to the frame 22. The bellows 30 communicates with a branch pipe 34, which is provided with a valve 35 for restricting the flow of fluid therethrough. The pipe 34 joins a main supply pipe 36, which in turn communicates with a control valve 37. The control valve 37 is of the three-way type, as shown in Figs. 9 and 10, so that fluid of suitable sort may be passed into the main supply pipe 36, and by being turned 90 degrees, establish communication between pipe 36 and a discharge pipe 38, which returns the fluid from the lines and bellows back to a reservoir 39. A fluid pressure pump, 40, is mounted on one of the side frames 11, in a position to be driven by a belt 41, which passes around the pulley wheel of the usual cooling fan for the tractor radiator. The pump 40 discharges through a pipe 42, which leads to a T connection, 43, one branch of which communicates with the control valve, 37, and the other branch of which communicates with a similar control valve which governs the opposite side of the driving mechanism.

The outer end of the shaft 20 extends through the brake drum 24, and is secured to one member of a normally disengaged clutch mechanism, 44, which is adapted to be engaged with the other member thereof by a fluid pressure expansible bellows, 45. The clutch 44 carries a chain sprocket gear, 46, over which runs a drive chain, 47, to the caterpillar tractor treads at that side of the machine.

The clutch mechanism 44 and the operating bellows therefor are more clearly shown and described in detail in my copending United States application for patent, Serial No. 398,736, filed October 10, 1929, and entitled, "Control mechanism for power shovels".

A branch fluid supply pipe, 48, having a valve 49 interposed therein, provides communication between bellows 45 and the main supply pipe, 36, so that the fluid discharged through the main pipe 36 will flow to both the clutch operating bellows 45 and the brake release operating bellows 30.

The rearwardly extending transmission drive shaft which carries the ring gear driving worm, 18, extends through the rear end of the ring gear and axle shaft housing, 21, and is splined at 50 to receive the hub of an over-running clutch member, 51. Clutch 51 has its periphery notched out to provide a plurality of seats 52, for rolls 53, the depths of the seats being slightly greater than the diameter of the rolls. One wall thereof is arranged at a tangent with respect to the general circumference of the clutch member so that said rolls are cramped between the tangential wall and the axially extending rim 54 of an outer clutch member 55. The clutch member 55 surrounds and embraces the clutch member 51 and the hub thereof is splined to the end of a rearwardly extending co-axially journaled shaft, 56.

A suitable housing, 57, surrounds and protects the clutch member, and a rear portion 58 thereof carries double annular ball bearings, 59, which support shaft 56. Shaft 56 is connected in co-axial alignment with the shaft 60 through a universal joint, 61.

The rear end of the shaft 60 is journaled on bearings 61, in a gear box 62, in the form of a depending annular rim which has its upper edge secured to a horizontally disposed platform or base member, 63. The lower end of the gear box 62 is closed by a cover plate, 64, with a centrally located drain plug, 65, therein. The rear end of the shaft 60 extends into the gear box 62, and has a bevel pinion, 66, keyed or splined thereon, which meshes with a complementary bevel gear, 67, keyed or splined to the lower end of a vertically disposed shaft 68.

The shaft 68 is journaled adjacent its upper and lower ends on bearings 69, the outer races of which are carried at the top and bottom ends respectively, of an axially extending vertically disposed annular passageway, 70, which is formed eccentrically through the platform 63, and an upstanding annular rim, 71, cast integrally therewith.

The outer edge of the platform 63 is provided with a radially extending annular rim, 72, the inner edge of which is provided with internal gear teeth, 73. The outer radially extending portion of the rim 72 is tapered on its upper and lower sides as shown in 74 and 75, respectively, so as to form upper and lower trackways for the bearing rollers of a turntable, 76. The turntable 76 is provided with a plurality of circumferentially spaced tapered rollers, 77, journaled by anti-friction bearings, 78, on radially extending studs, 79, which are mounted in integrally formed depending flanges, 80 and 81, disposed in spaced parallel relation.

Means are provided for lubricating the bearings 78 and comprise passageways 82, drilled in the studs 79, one end of which terminates in the space between the bearings and the other end of which terminates at the outer exposed end of the stud. A suitable lubricant fitting, 83, is threaded into the outer end of passageway 82, so that a lubricant from a suitable source of supply may be introduced thereto.

The rollers, 77, are tapered at the same angle as the track 74, so as to have proper fit thereon when the turntable is rotated horizontally about its vertical axis. Turntable 76 is also provided with a pair of circumferentially spaced hold-down bearings, each of which comprises a tapered roller, 84, journaled by anti-friction bearings 85 on the inner end of a stud 86. The stud 86 rigidly mounted at the lower depending end of a bracket, 87. The bracket 87 is mounted so as to be vertically adjustable on a depending flange, 88, integrally formed at the outer peripheral edge of the turntable by a pair of cap screws, 89 and 90. The screws 89 and 90 pass through slightly elongated holes, 91, formed in bracket 87, and thread into the table flange 88. The upper end of the bracket 87 is provided with an inwardly extending lug, 92 which over-laps the marginal edge of the table 76. The lug 92 is vertically drilled and tapped to receive an adjusting screw 93, which may be locked in adjusted position by a nut, 94. The roller 84 is tapered at the same angle as the under trackway 75, so as to have the proper bearing relation there against when the table is rotated relatively to platform 63.

The turntable 76 is provided with a downwardly extending annular sleeve portion 98 which encircles the upwardly extending sleeve portion 71 of the platform 63 and is provided with a bushing 99 therebetween which acts to center the turntable on the platform. Secured to the upper face of the turntable 76 in concentric relation with respect to the sleeves 71 and 98 is a flange member 95 through which the shaft 68 projects. The upper end of the flange member receives a thrust bearing 97 about the shaft 68 for taking the thrust of the bevel pinion gear 100, as will hereinafter be apparent.

The top end of the shaft 68 is preferably splined to receive the gear 100, which meshes with and drives a complementary bevel gear 101. The gear 101 is keyed to a horizontally disposed shaft 102, which is journaled on bearings 103, in spaced parallel relation above the turntable 76, with one end connected to a clutch, 104, which is actuated by an expansible bellows 105. A sprocket gear 106 is connected to the clutch 104 so that said sprocket gear is driven when the clutch is engaged by the expansion of the bellows 105.

The shaft 102 also extends in the opposite direction from the bevel gear 101 and carries a chain sprocket gear 107, over which runs a drive chain 108, the gear being arranged to engage the outer side of said chain. The chain 108 passes around and embraces the sprocket gears 109, 110 and 111, which are keyed to horizontally disposed shafts 112, 113 and 114, respectively.

The shaft 112 is in spaced parallel relation to the drive shaft 102 and carries a drum 115 which is detachably connectable to a normally disengaged clutch 116. Clutch 116 is operated to engage the drum with said shaft by a fluid pressure operated expansible bellows 117. The drum 115 is for a drag line when the machine is used as a drag line excavator with the dipper stick removed.

In the arrangement shown in the drawings the boom is provided with a dipper stick, 118, which is controlled and operated through a conventional rack and pinion driven by a chain, 119. The chain 119, at its lower end, loops around a sprocket gear rigid on one end of a sleeve, 120, which is journaled on a shaft, 121. A similar sprocket gear is secured to the other end of sleeve 120, for an intermediate drive chain 122 which in turn loops around a sprocket gear formed on a sleeve, 123, journaled on shaft 112. The sleeve 123 is rigid with the drum 115, and also is provided with a sprocket gear rigid thereon for engaging with the chain 124, which passes around the sprocket gear 106. Sleeve 123 is further provided with a brake drum 125 within which is a suitable manually operable brake mechanism.

The shaft 121 is mounted on integrally formed upstanding brackets, 126 and 127, integrally formed on the top surface of table 76, in spaced parallel relation, and pivotally supports the bifurcated ends 128, 129, of a boom, 130.

The shaft 121, at its opposite ends, also supports the base ends of upwardly extending and inwardly converging mast members, 131 and 132. The upper ends of the mast members 131 and 132 fit into and are secured in tubular sockets formed in the arms of an inverted U shaped yoke, or bracket, 133, which supports a transversely extending pin 134, upon which is journaled a pulley wheel 135. A back brace 136 has its upper end formed with an eye which receives the pin 134 and the base end of said back brace is also provided with an eye which is secured between upwardly extending spaced parallel lugs, 137 and 138, by a pin 139. The lugs 137 and 138 are integrally formed on and extend upwardly from the turntable 76, at a point on marginal edge thereof, which is diametrically opposite to the direction of projection of the boom, 130.

Means are provided for rotating the turntable in either direction at will, and comprise opposed bevel pinion gears, 140 and 141, driven by clutches 142 and 143, respectively. The clutches 142 and 143 are normally disengaged and are operable to be engaged by fluid pressure operated expansible bellows, 144 and 145, respectively. The driving members of the clutches 142 and 143 are secured to the shaft 114, and the bevel pinion gears 140 and 141 are in constant mesh with a complementary horizontally disposed bevel pinion gear 146, which is splined at 147 on the top end of a vertically disposed shaft 148.

Shaft 148 is journaled in upwardly and downwardly extending tubular bosses, 149 and 150, respectively, integrally formed on the turntable 76. A thrust bearing 151 is interposed between the hub of the pinion gear 146, and the upper end of the boss, 149, for supporting the gear against the action of its driving pinions. The lower end of shaft 148 has a spur pinion gear, 152, splined thereon, which is in constant mesh with the internal gear teeth, 73, formed on the platform flange 72.

The gear 146 is formed with a depending axially extending flange, 153, which serves as a brake drum for internally expanding brake mechanism, 154. The brake mechanism, 154, is adapted to be operated by a lever, 155.

The shaft 113, which is journaled on upstanding brackets, 156 and 157, carries a cable line drum 158, connected by a sleeve, 159, to a brake drum, 160. The drum 158 is connected by a clutch 161 to the shaft 113, said clutch being normally disengaged and being arranged to be operated to become engaged by a fluid pressure operated expansible bellows, 162. The line drum 158 is adapted to carry a cable line, 163, which passes over a sheave, 164, journaled by a pin 165 on the outer tip end of boom 130, and extends down and is connected to a bucket, 166, carried on the lower end of the dipper stick, 118. This line is usually termed the "hoisting" line for the bucket.

The shaft 102 extends beyond the sprocket gear 107, and is provided with a pair of opposed bevel gears, 167 and 168, freely rotatable thereon. The extreme end of shaft 102 is journaled on an outboard bearing, 169, carried at the top end of an upstanding bracket, 170, integrally formed on the upper surface of the turntable 76, closely adjacent the marginal edge thereof. The bevel gears 167 and 168 are in constant mesh with a bevel pinion 171, which is keyed to the top end of a downwardly inclined shaft, 172, journaled in a pair of spaced bearings 173, which are supported on the turntable 76.

Means are provided for driving either of the bevel gears 167 and 168 and comprise an axially slidable dog or other clutch, 174, which is located between the gears and slidably keyed to the shaft 102. A suitable yoke, 175, and operating handle, 176, are pivoted at 177 so that the clutch 174 may be axially shifted to engage either of the bevel gears 167 or 168.

The lower end of the shaft 172 has a worm, 178, rigid thereon, which meshes with a worm gear 179, keyed to the outwardly projecting end of a transversely disposed shaft 180. The shaft 180 is suitably journaled in bearing boxes 181, bolted to the underside of turntable 76. The said turntable, for a short distance immediately above shaft 180, is cut out to provide an opening, 182, through which projects a portion of the side flanges 183 of a drum 184. The drum 184 is provided for a cable line 185, which raises or lowers the outer swinging end of the boom 130.

The turntable 76 has an operator's seat, 186, mounted thereon by an arm, 187, for the workman who operates the shovel. Immediately in front of seat 186, mounted on the top end of a vertically disposed standard, 188, is mounted a series of fluid control valves, 189, which have operating handles, 190, for rotating the cores thereof. The valves 189 are especially constructed fluid control valves which, when in neutral position, establish communication between the expansible bellows to which it is connected and the discharge fluid return pipe, and when moved in one direction from neutral will establish communication between a bellows and a source of fluid under pressure, and when moved in the opposite direction from neutral, will establish communication between the other bellows of the companion operating unit and said source of fluid under pressure.

Means are provided for supplying fluid under pressure to the series of control valves, 189, and comprise a fluid pressure pump mounted within a reservoir, 191, which is driven through a bevel pinion gear 192, from a bevel gear 193, keyed to the end of the shaft 114.

The manually operable internally expanding brake assemblies on the various units are joined by suitable connections to a series of pedals, 194, which are mounted on the turntable directly in front of the operator's seat, 186, in a position to be easily manipulated by such operator's feet. Each of the pedals is provided with a toothed rack, 195, so that it may be detachably secured in depressed position for maintaining the brake in engaged position when desired.

In the operation of this machine it is normally moved about from place to place by putting the tractor transmission in either first, second or high gear and then manipulating the control valves 37 so as to introduce fluid under pressure into the main supply pipes 36. As the fluid passes into this pipe it enters both of the branch pipes, 34 and 38. The valves 35 and 49 in these pipes are so adjusted so that if the fluid flows into expanding bellows 45 which engages the clutch 44, and into bellows 30 which releases the brake 24, the brake will not be released until the clutch is beginning to grip. As the flow of fluid continues the brake is fully released and the clutch fully engaged, thus transmitting power from the tractor through the axle shaft 20, to the pinion 46 and chain 47 carried thereby, thus driving the endless tractor tread connected thereto. When it is desired to move the machine in a straight path, both the valves, 37, are opened and both tractor treads are thereby actuated in unison. The machine is guided to right or left by disconnecting momentarily, the appropriate driving mechanism on the side in which it is desired to turn the machine.

Due to the over-running clutch mechanism interposed between the worm shaft 18 and the drive shaft 60, which leads to the turntable and the mechanism mounted thereon, it is impossible for the turntable or any of the mechanism thereon to be accidentally connected to and operated by a tractor while the transmission of the tractor is driving through the usual forward speeds.

Upon arriving at the job the machine is backed into position by placing the transmission of the tractor in reverse gear. When in position the turntable and any of the units mounted thereon may be driven by the tractor by manipulating the appropriate fluid control valves which lead to such unit. The turntable may be rotated in either direction by passing fluid into the bellows, 144 or 145. Expansion of these bellows engage the clutches 142 and 143, respectively, thus driving the pinion 152, which meshes with the internal gear 73 of the turntable.

The outer swinging end of the boom 130 may be raised or lowered by the engagement of the clutch 174 with either gear 167 or gear 168. These gears mesh with and rotate pinion 171, which through the medium of the worm 178, will rotate the shaft 180, upon which the drum 179 is rigidly secured. The cable 185 is wound around the drum 179 and thus the outer end of the boom may be raised or lowered at will. This drive being through a worm end gear, does not require any brake mechanism for holding the boom in any set position.

The dipper stick 118, which carries the bucket 166, may be raised or lowered through the chain 119, which is rotated in one direction by the clutch 116, and in the other direction by the clutch 104. These clutches are normally disengaged and are moved into engagement by expanding the bellows 117 and 105, respectively. If the dipper stick is removed and a drag line bucket substituted therefor, the drag line cable is handled by the drum 115, the bucket being supported by line 163, which, in the embodiment shown, serves as a ground line for bucket 166. This line 163 is carried by drum 158 which is driven through clutch 161. The clutch 161 is engaged by expansion of bellows 162.

The back brace 136 of the mast which supports the sheave 135, has its base end attached to the turntable at a point diametrically opposite to the side upon which is mounted the boom 130. This rear side of the turntable is provided with a pair of circumferentially spaced bearing rollers, 84, which engage the underside of radially extended flange 72, so as to run on lower trackway 75, and thus prevent the turntable from tipping during the loading of the bucket 166, and the subsequent manipulation thereof. By reason of the back brace being mounted on the turntable, the bucket may be swung directly to the rear, in either direction from its digging position, so as to discharge into a truck which has been backed up directly in the rear of the machine.

This arrangement permits the digging of a cut which is no wider than the treads 13 and 14, on which the machine is mounted.

By reason of the large amount of work which is done through the reverse gear of the tractor mechanism it is usually advisable to replace the bearing on the reverse gear shaft of the tractor transmission with a bearing of larger size and different characteristics than that normally furnished with this form of equipment.

Although but one specific embodiment of this invention has been herein shown and described, it will be understood that numerous details of the construction shown may be altered or omitted without departing from the spirit of this invention, as defined by the following claims.

I claim:

1. In a power shovel, the combination of a frame, traction road wheels supporting said frame, excavating mechanism mounted on said frame, a tractor mounted on said frame, a gear transmission for said tractor having forward and reverse speeds, a shaft driven by said transmission, means driven by said shaft for operating said road wheels, other means driven by said shaft for operating said excavating mechanism, and means interposed between said excavating mechanism and said transmission for causing said excavating mechanism to be operated only when said transmission is driving in reverse and automatically discontinuing the drive when the transmission is in direct drive.

2. In a power shovel, the combination of a frame, traction road wheels supporting said frame, excavating mechanism mounted on said frame, a tractor mounted on said frame, a gear transmission for said tractor having forward and reverse speeds, a shaft driven by said transmission, means driven by said shaft for operating said road wheels, other means driven by said shaft for operating said excavating mechanism, a one way clutch interposed between said excavating mechanism and said transmission for causing said excavating mechanism to be operated only when said transmission is driving in reverse.

3. In a power shovel, the combination of a frame, traction road wheels supporting said frame, excavating mechanism mounted on said frame, a tractor mounted on said frame, a gear transmission for said tractor having forward and reverse speeds, an axle shaft in said tractor, a ring gear on said axle shaft, a shaft driven by said transmission, a gear on said driven shaft engaging with and driving said ring gear, means driven by said axle shaft for operating said road wheel, a one way clutch connected to said driven shaft, said clutch being arranged to over-run when said transmission is driving in a forward speed and to transmit power when driving in reverse gear, and driving connections between the clutch and said excavating mechanism.

4. A power shovel comprising a frame, an engine fixed upon the frame, a turntable base also fixed upon the frame, means for preventing vertical displacement of the turntable relative to the turntable base, a shovel boom hinged to said turntable, a shovel having a dipper stick vertically swingably mounted upon the boom, a gear on the boom engaging a rack on the dipper stick, a vertical shaft disposed in co-axial arrangement with respect to said turntable, a horizontal shaft, a driving connection between said horizontal and vertical shafts, a selectively operable sprocket on said horizontal shaft, a second horizontal shaft having a driving connection with the gear for operating the rack on said dipper stick, a third horizontal shaft having a winding drum thereon for a dipper hoisting line, means for rotating said turntable through a complete circle, a fourth horizontal shaft having a driving connection with the means for rotating said turntable, sprockets on said second, third and fourth horizontal shafts, all of said horizontal shafts being journaled on said turntable in parallel relation with each other, and a single sprocket chain for engaging the four sprockets for simultaneous driving of the horizontal shafts.

5. A power shovel, the combination of a frame, traction road wheels supporting said frame, an engine and a turntable base mounted on opposite ends of said frame, excavating mechanism mounted on said turntable, a gear transmission for said engine having forward and reverse speeds, a shaft driven by said transmission, means driven by said shaft for operating said wheels, other means driven by said shaft for operating said excavating mechanism and for rotating said table and excavating mechanism through a complete circle, and a one way clutch interposed between said transmission and said turntable and excavating mechanism for operating the latter only when said transmission is driving in reverse.

WALTER E. BERNHARD.